(12) United States Patent
Murugiah (10) Patent No.: US 10,256,615 B2
(45) Date of Patent: Apr. 9, 2019

(54) BUS SUPPORTS AND RELATED ASSEMBLIES AND METHODS

(71) Applicant: Tyco Electronics Canada ULC, Markham (CA)

(72) Inventor: Sachidanandan Murugiah, Stouffville (CA)

(73) Assignee: Tyco Electronics Canada ULC, Markham, Ontario (CA)

( * ) Notice: Subject to any disclaimer, the term of this patent is extended or adjusted under 35 U.S.C. 154(b) by 270 days.

(21) Appl. No.: 15/290,745

(22) Filed: Oct. 11, 2016

(65) Prior Publication Data

US 2017/0110865 A1  Apr. 20, 2017

Related U.S. Application Data

(60) Provisional application No. 62/242,487, filed on Oct. 16, 2015.

(51) Int. Cl.
*H02G 5/02* (2006.01)
*H01B 17/16* (2006.01)
*H01B 17/44* (2006.01)

(52) U.S. Cl.
CPC ............ *H02G 5/025* (2013.01); *H01B 17/16* (2013.01); *H01B 17/44* (2013.01)

(58) Field of Classification Search
CPC ......... H02G 5/025; H01B 17/16; H01B 17/44

USPC .................. 174/140 CR, 168–171
See application file for complete search history.

(56) References Cited

U.S. PATENT DOCUMENTS

| 2,415,649 | A | | 2/1947 | Matthysse | |
|---|---|---|---|---|---|
| 2,616,646 | A | | 11/1952 | Matthysse | |
| 4,039,744 | A | | 8/1977 | Seaquist | |
| 4,215,237 | A | * | 7/1980 | Burtnett | H02G 5/066 174/169 |
| 4,281,213 | A | * | 7/1981 | Sciscione | H02G 5/025 174/169 |
| 6,455,782 | B1 | * | 9/2002 | Lin | H01B 17/44 174/127 |

* cited by examiner

*Primary Examiner* — Dimary S Lopez Cruz
(74) *Attorney, Agent, or Firm* — Myers Bigel, P.A.

(57) ABSTRACT

A bus support includes a corona shield portion and a bus support portion on the corona shield portion. The bus support portion includes an insulator engagement ledge including one or more mounting apertures configured to receive a fastener therethrough for mounting the bus support to an insulator. The bus support portion includes first and second bus support walls extending upwardly from opposite sides of the insulator engagement ledge. Each bus support wall includes a U-shaped channel defined therein that is configured to receive and support a cylindrical and/or tubular bus conductor. The corona shield portion and the bus support portion form a monolithic structure.

20 Claims, 5 Drawing Sheets

BUS SUPPORTS AND RELATED ASSEMBLIES AND METHODS

RELATED APPLICATIONS

This application claims priority from U.S. Provisional Application No. 62/242,487, filed Oct. 16, 2015, the disclosure of which is hereby incorporated herein in its entirety.

BACKGROUND

Some bus supports for high voltage applications are used to support cylindrical and/or tubular bus conductors.

Figure 1:
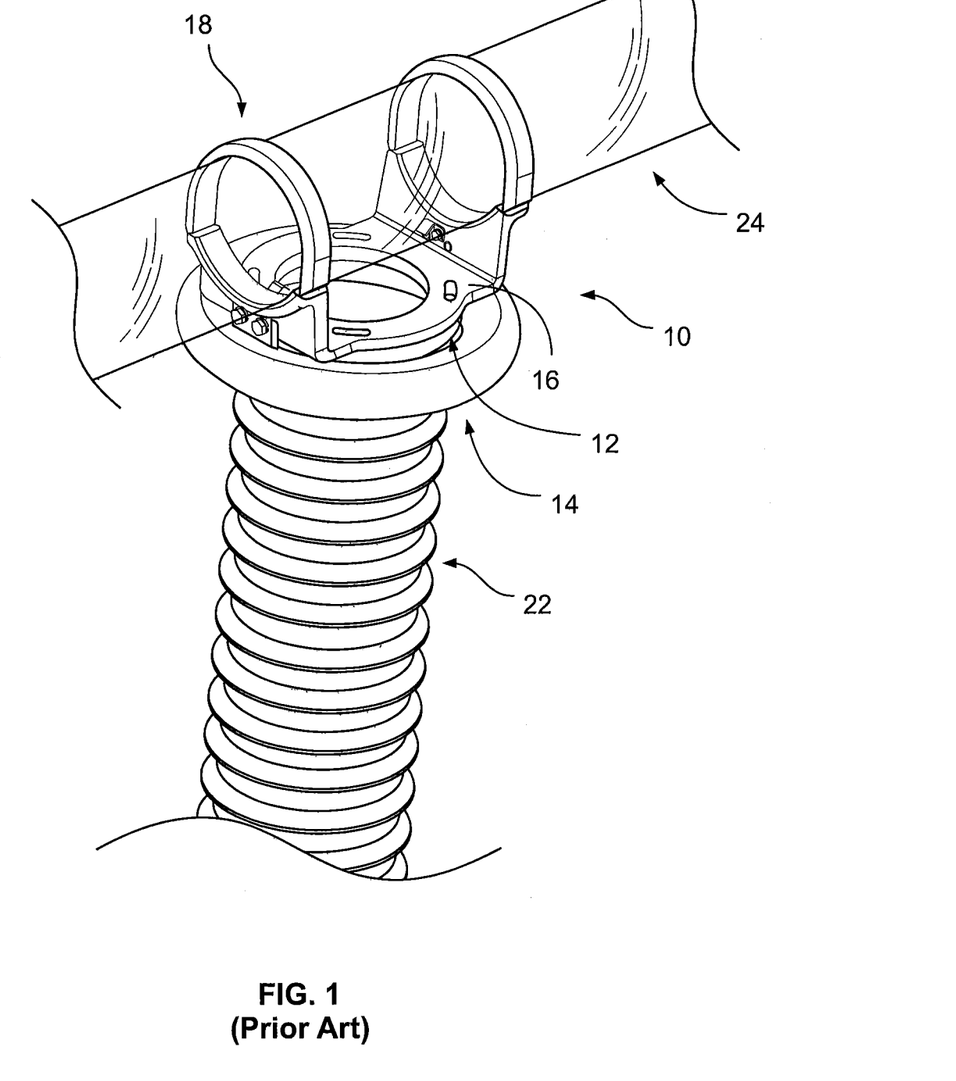
FIG. 1 is a perspective view of a known bus support mounted to an insulator.
Figure 2:
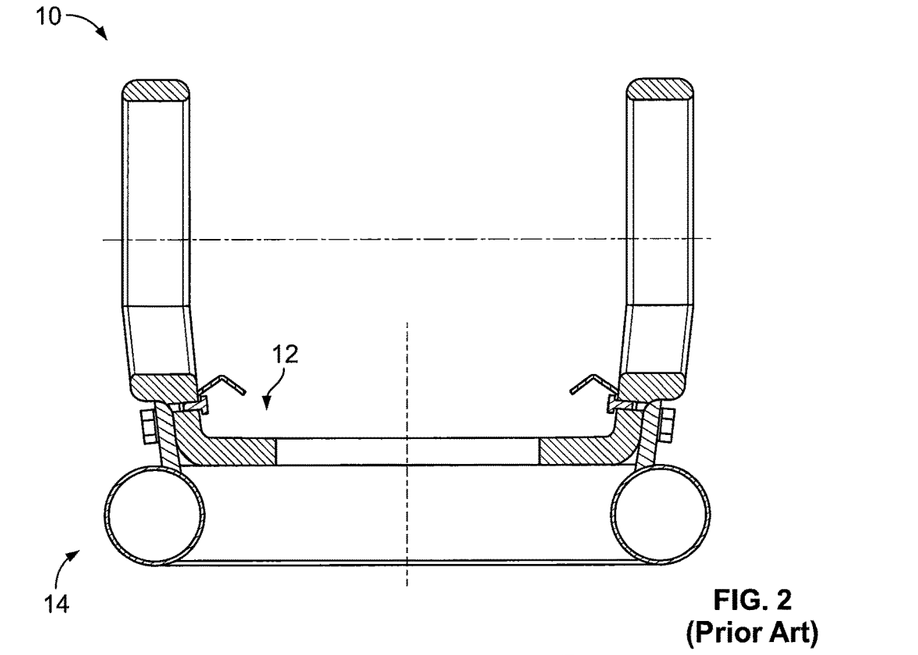
FIG. 2 is a sectional view of the bus support of FIG. 1.

One such known bus support 10 is illustrated in FIGS. 1 and 2. The bus support 10 includes a bus support body 12 mounted to a corona ring 14. The bus support body 12 includes a plurality of mounting apertures 16 for mounting the bus support 10 to an insulator 22. A cylindrical, tubular bus conductor 24 is received in channels defined by the bus support body 12 and/or keepers 18 connected to the bus support body 12.

The corona ring is used to distribute the electric field gradient and lower its maximum values below the corona threshold to help prevent corona discharge. Corona discharge is an ionization of air adjacent to high voltage conductors. It is sometimes visible as a dim blue glow in the air next to high voltage equipment. It is caused by the leakage of current from the conductor into the air, and can represent a significant waste of power in electric power transmission lines and equipment.

The corona ring (also referred to as a grading ring) such as the one shown in FIGS. 1 and 2 is also used to protect the insulator. The corona ring 14 reduces the potential gradient along the insulator, thereby helping to prevent premature electrical breakdown. The corona ring 14 reduces the gradient at the end of the insulator 22, resulting in a more even voltage gradient along the insulator. This allows for a shorter and/or less expensive insulator to be used for a given voltage.

The corona ring 14 is typically formed by bending a hollow tube in a circle and welding the end points to form a torus. The corona ring should be smooth and therefore substantial machining is typically performed including at the weld point. Forming the corona ring can be a costly and time-consuming process.

SUMMARY

Some embodiments of the present invention are directed to a bus support. The bus support includes a corona shield portion and a bus support portion on the corona shield portion. The bus support portion includes an insulator engagement ledge including one or more mounting apertures configured to receive a fastener therethrough for mounting the bus support to an insulator. The bus support portion includes first and second bus support walls extending upwardly from opposite sides of the insulator engagement ledge. Each bus support wall includes a U-shaped channel defined therein that is configured to receive and support a cylindrical and/or tubular bus conductor. The corona shield portion and the bus support portion form a monolithic structure.

In some embodiments, each of the first and second bus support walls includes an outer surface and an opposite inner surface with a weight reduction recess defined in the inner surface that extends downwardly past the insulator engagement ledge. The bus support portion may include first and second side walls that extend upwardly from opposite sides of the insulator engagement ledge and that extend between the first and second bus support walls. Each one of the weight reduction recesses may extend along a major portion of a distance between the first and second side walls.

In some embodiments, the corona shield portion includes a curved outer surface and a substantially flat inner surface. The corona shield portion may have a substantially semi-circular cross-sectional shape. The corona shield portion may be solid.

In some embodiments, the bus support is formed of cast aluminum. The corona shield portion may be machined to have an average surface roughness of no greater than 63 micro-inches.

In some embodiments, the corona shield portion has a diameter of at least 17.4 inches.

In some embodiments, each of the first and second bus support walls includes an upper surface on opposite sides of the U-shaped channel. The bus support may include an arch-shaped support member connected to the upper surface of each of the first and second bus support walls. The arch-shaped members may be configured to surround an upper portion of a cylindrical and/or tubular bus conductor received in the U-shaped channels. In some embodiments, the bus support includes first and second springs connected to the insulator engagement ledge adjacent the first and second bus support walls, respectively. The first and the second springs may be configured to resiliently engage a cylindrical and/or tubular bus conductor received in the U-shaped channels.

In some embodiments, the corona shield portion defines a central circular opening configured to receive an insulator therethrough when the insulator engagement ledge is mounted to the insulator such that the corona shield portion surrounds an upper portion of the insulator.

Some other embodiments of the present invention are directed to a method of forming a bus support. The method includes casting a one-piece aluminum bus support. The bus support includes a corona shield portion and a bus support portion on the corona shield portion. The bus support portion includes an insulator engagement ledge including one or more mounting apertures configured to receive a fastener therethrough for mounting the bus support to an insulator. The bus support portion includes first and second bus support walls extending upwardly from opposite sides of the insulator engagement ledge, with each bus support wall including a U-shaped channel defined therein that is configured to receive and support a cylindrical and/or tubular bus conductor. The method includes machining the corona ring portion to be substantially smooth.

In some embodiments, each of the first and second bus support walls includes an outer surface and an opposite inner surface with a weight reduction recess defined in the inner surface that extends downwardly past the insulator engagement ledge.

In some embodiments, the method includes machining the corona ring portion to have an average surface roughness of no greater than 63 microinches.

Some other embodiments of the present invention are directed to a bus support. The bus support includes a corona shield portion and an integrally formed bus support portion on the corona shield portion. The bus support portion includes an insulator engagement ledge including one or more mounting apertures configured to receive a fastener therethrough for mounting the bus support to an insulator. The bus support portion includes first and second bus support walls extending upwardly from opposite sides of the insulator engagement ledge, with each bus support wall including a U-shaped channel defined therein that is configured to receive and support a cylindrical and/or tubular bus conductor. Each bus support wall includes an outer surface and an opposite inner surface. A first weight reduction recess is formed in the inner surface of the first bus support wall and extends downwardly past the insulator engagement ledge. A second weight reduction recess is formed in the inner surface of the second bus support wall and extends downwardly past the insulator engagement ledge.

In some embodiments, the bus support portion includes first and second side walls that extend upwardly from opposite sides of the insulator engagement ledge and that extend between the first and second bus support walls. Each of the first and second weight reduction recesses may extend along a major portion of a distance between the first and second side walls.

Some other embodiments of the present invention are directed to a bus support and insulator assembly including an insulator and a bus support including a corona shield portion and an integrally formed bus support portion on the corona shield portion. The bus support portion includes an insulator engagement ledge mounted to the top of the insulator such that the corona shield portion surrounds an upper portion of the insulator.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "monolithic" means an object that is a single, unitary piece formed or composed of a material without joints or seams.

Figure 3:
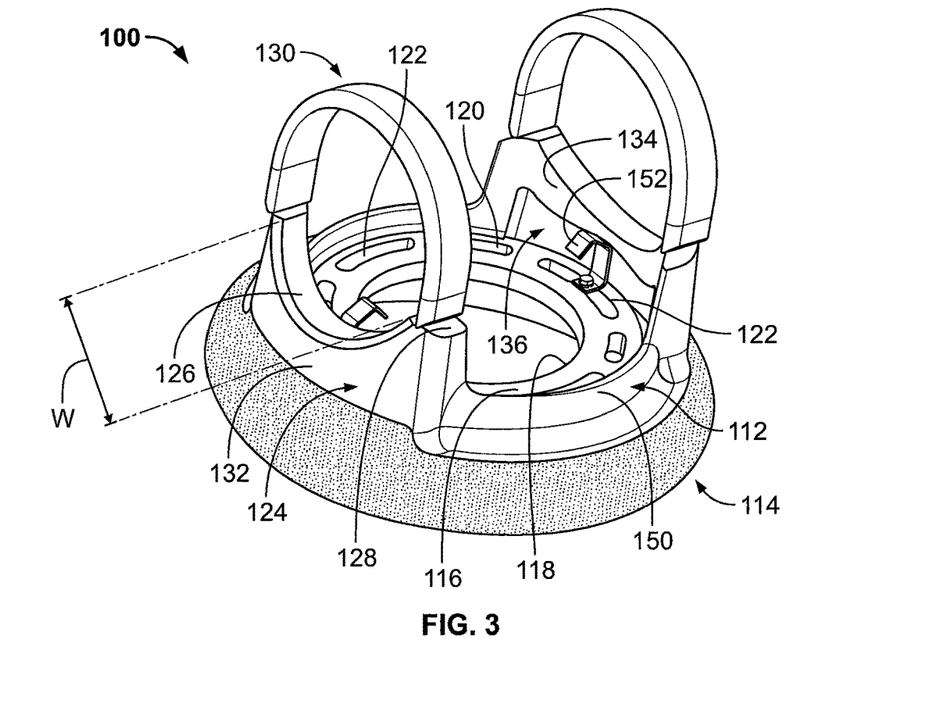
FIG. 3 is a perspective view of a bus support according to some embodiments of the present invention.
Figure 4:
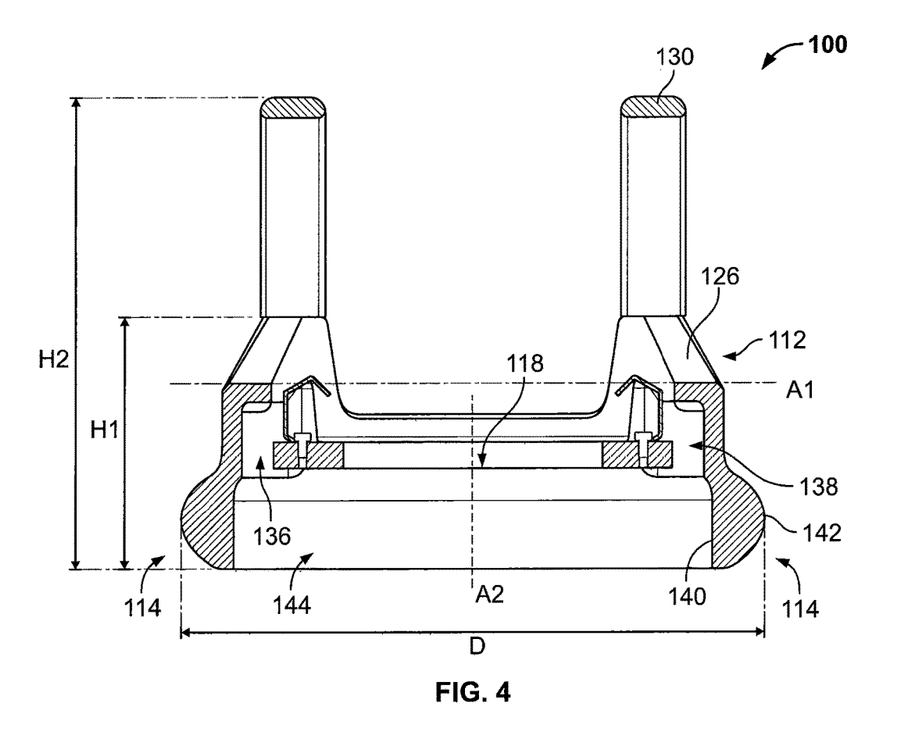
FIG. 4 is a sectional view of the bus support of FIG. 3.

A bus support 100 according to some embodiments is illustrated in FIGS. 3 and 4. The bus support 100 includes a bus support and/or insulator engagement portion 112 and a corona shield portion 114.

The bus support portion 112 includes an insulator engagement ledge or surface 116. The insulator engagement ledge 116 defines a central opening 118. A plurality of mounting apertures or slots 120 are defined in the insulator engagement ledge 116. The mounting apertures 120 are configured to receive fasteners therethrough so that the bus support 100 can be mounted to an insulator, as will be described in more detail below. A plurality of elongated slots 122 may also be defined in the insulator engagement ledge 116. The slots 122 may reduce the weight of the bus support 100.

The bus support portion 112 includes a pair of bus support walls 124 disposed on opposite sides of the insulator engagement ledge 116. Each bus support wall 124 extends upwardly from the insulator engagement ledge 116.

An open channel or groove 126 is defined in each of the bus support walls 124. The channels 126 are generally semi-circular in shape (e.g., U-shaped) and are configured to receive a cylindrical bus, as will be described in more detail below. The channels 126 define a longitudinal axis A1 of the bus support 100.

Each bus support wall 124 includes a pair of spaced apart upper surfaces 128 on opposite sides of the channel 126. In some embodiments, a bus support arch 130 (also referred to herein as a keeper) is on the upper surfaces 128. Where used, the bus support arches 130 surround an upper portion of a cylindrical bus that is received in the channels 126. In some embodiments, the arches 130 are connected (e.g., welded) to the bus support walls 124. In some other embodiments, the arches 130 and the walls 124 are integrally formed or monolithic.

Each bus support wall 124 includes an outer surface 132 and an inner surface 134. A recess 136 is defined in the inner surface 134. The recess 136 extends downwardly past the insulator engagement ledge 116 to an inner surface 140 of the corona shield portion 114. The recesses 136 reduce the weight of the bus support 100.

The inner surface 140 of the corona shield portion 114 may be flat or substantially flat. The corona shield portion 114 also includes a curved outer surface 142. In this regard, the corona shield portion 114 may have a half or semi-torus shape. As illustrated in FIG. 4, the corona shield portion 114 may generally have a cross-sectional shape of a semi-circle.

Figure 7:
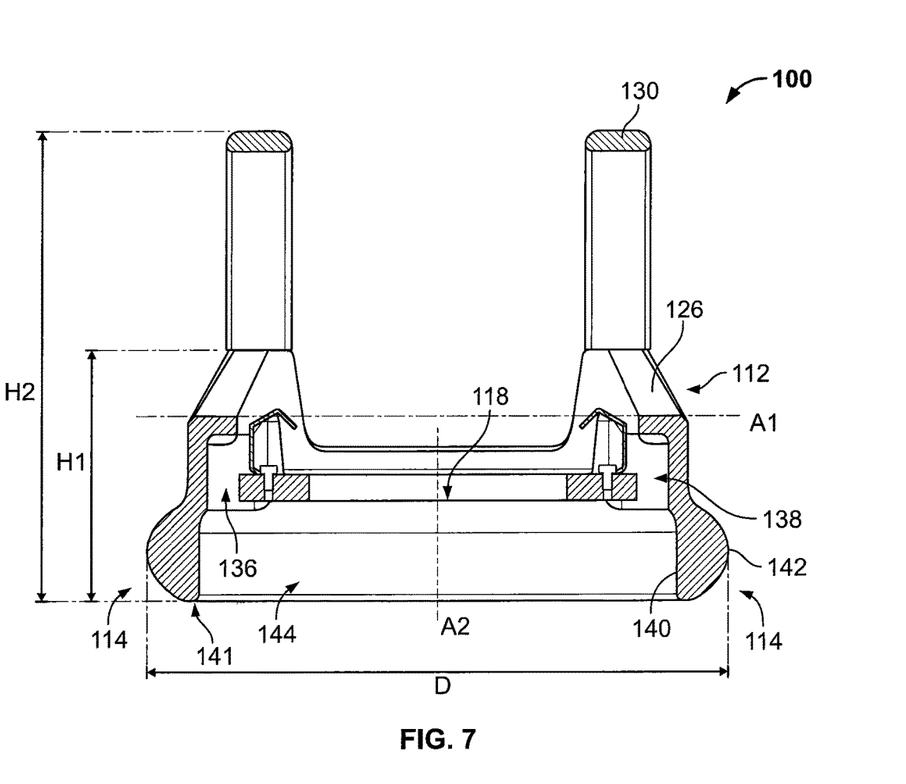
FIG. 7 is a sectional view of the bus support of FIG. 3 according to some other embodiments.

The bottom surface of the corona shield portion 114 may be free of sharp edges. In particular, referring to FIG. 7, an inner bottom portion or corner 141 may be curved. The radius at the inner bottom corner 141 reduces the likelihood of an increase in electrical field concentration that may generate an arc between the inner bottom corner 141 and the insulator.

The corona shield portion 114 defines a central opening 144. A transverse axis A2 of the bus support 100 extends through the center of the insulator engagement surface central opening 118 and the corona ring portion central opening 144.

The bus support portion 112 includes a pair of opposed sidewalls 150 that extend upwardly from opposite sides of the insulator engagement ledge 116. Each sidewall 150 extends between the opposed bus support walls 124. Each of the weight reduction recesses 136 may extend a major portion of a distance between the two sidewalls 150.

In some embodiments, the bus support portion 112 and the corona shield portion 114 of the bus support 100 are integrally formed (e.g., the bus support 100 as described above is a monolithic structure). In some embodiments, the bus support 100 is a single cast component or unit. The bus support 100 may be formed of any suitable material; an exemplary suitable material is aluminum.

Known bus supports such as the one shown in FIGS. 1 and 2 include at least two separate components: the bus support body 12 and the corona ring 14. The bus support body 12 is typically a cast aluminum component. The corona ring 14 is typically formed from an extruded aluminum hollow tube that is bent to a circular shape and welded at the tube end points. The corona ring 14 is machined to have a very smooth surface including at the weld point. The bus support body 12 and the corona ring 14 are connected with fasteners to form the bus support 10.

The corona rings used with known bus supports as described above are costly and time-consuming to produce. The single cast bus support 100 according to embodiments of the invention eliminates the need for a separate corona ring by incorporating the corona shield within the single cast body. In addition, the single cast bus support 100 according to embodiments of the invention does not require fasteners to couple separate bus support bodies and corona rings. This may result in a more robust design that is less likely to degrade and/or fail in the field.

The corona shield portion 114 of the bus support 100 may be machined after casting to achieve a smooth surface finish that is typically necessary to properly guide an electric arc to the insulator. In some embodiments, the corona shield portion 114 is machined (e.g., using a lathe) to have no greater than 63 microinches roughness average as set forth in ASME B46.1-2009 ("Surface Texture (Surface Roughness, Waviness and Lay)"). The corona shield portion 114 (indicated by the shaded region in FIG. 3) therefore may be considerably smoother than the remainder of the bus support including the bus support portion 112. As described above, known corona rings are formed by bending an extruded aluminum tube and welding the end points, and this weld area may be particularly time-consuming to machine to the appropriate smoothness. The corona shield portion 114 of the bus support 100 according to embodiments described herein does not include the welded area.

Various embodiments of the bus support 100 are configured to receive different bus sizes. For example, the bus support 100 may be configured to receive an 8 inch outer diameter (OD) tube, a 6 inch nominal pipe size (NPS) tube, a 5 inch NPS tube and a 4 inch NPS tube in various embodiments.

The corona shield portion 114 has a diameter D (FIG. 4). In various embodiments, the diameter D is between about 10 inches and 18 inches, between about 17 inches and 19 inches, and about 17.9 inches. This dimension may vary according to the insulator diameter and/or the bus support mounting aperture 120 pitch circle diameter.

The bus support 100 has a height H1 without the arch supports 130 and a height H2 with the optional arch supports 130 (FIG. 4). For an 8 inch OD tube, the height H1 is between about 7.6 inches and 8.0 inches, between about 7.7 inches and 7.9 inches, and about 7.8 inches in various embodiments. For a 6 inch NPS tube, the height H1 is between about 7.3 inches and 7.7 inches, between about 7.4 inches and 7.6 inches, and about 7.5 inches in various embodiments. For a 5 inch NPS tube, the height H1 is between about 7.0 inches and 7.4 inches, between about 7.1 inches and 7.3 inches, and about 7.2 inches in various embodiments. For a 4 inch NPS tube, the height H1 is between about 6.7 inches and 7.1 inches, between about 6.8 inches and 7.0 inches, and about 6.9 inches in various embodiments.

For an 8 inch OD tube, the height H2 is between about 14.2 inches and 14.6 inches, between about 14.3 inches and 14.5 inches, and about 14.4 inches in various embodiments. For a 6 inch NPS tube, the height H2 is between about 12.8 inches and 13.2 inches, between about 12.9 inches and 13.1 inches, and about 13.0 inches in various embodiments. For a 5 inch NPS tube, the height H2 is between about 11.7 inches and 12.1 inches, between about 11.8 inches and 12.0 inches, and about 11.9 inches in various embodiments. For a 4 inch NPS tube, the height 112 is between about 10.7 inches and 11.1 inches, between about 10.8 inches and 11.0 inches, and about 10.9 inches in various embodiments.

The U-shaped channels 126 of the bus support portion 112 have a maximum width W (FIG. 3). For an 8 inch OD tube, the width W is between about 6.9 inches and 7.3 inches, between about 7.0 inches and 7.2 inches, and about 7.1 inches in various embodiments. For a 6 inch NPS tube, the width W is between about 5.7 inches and 6.1 inches, between about 5.8 inches and 6.0 inches, and about 5.9 inches in various embodiments. For a 5 inch NPS tube, the width W is between about 4.7 inches and 5.1 inches, between about 4.8 inches and 5.0 inches, and about 4.9 inches in various embodiments. For a 4 inch NPS tube, the width W is between about 3.8 inches and 4.2 inches, between about 3.9 inches and 4.1 inches, and about 4.0 inches in various embodiments.

Figures 5, 6:
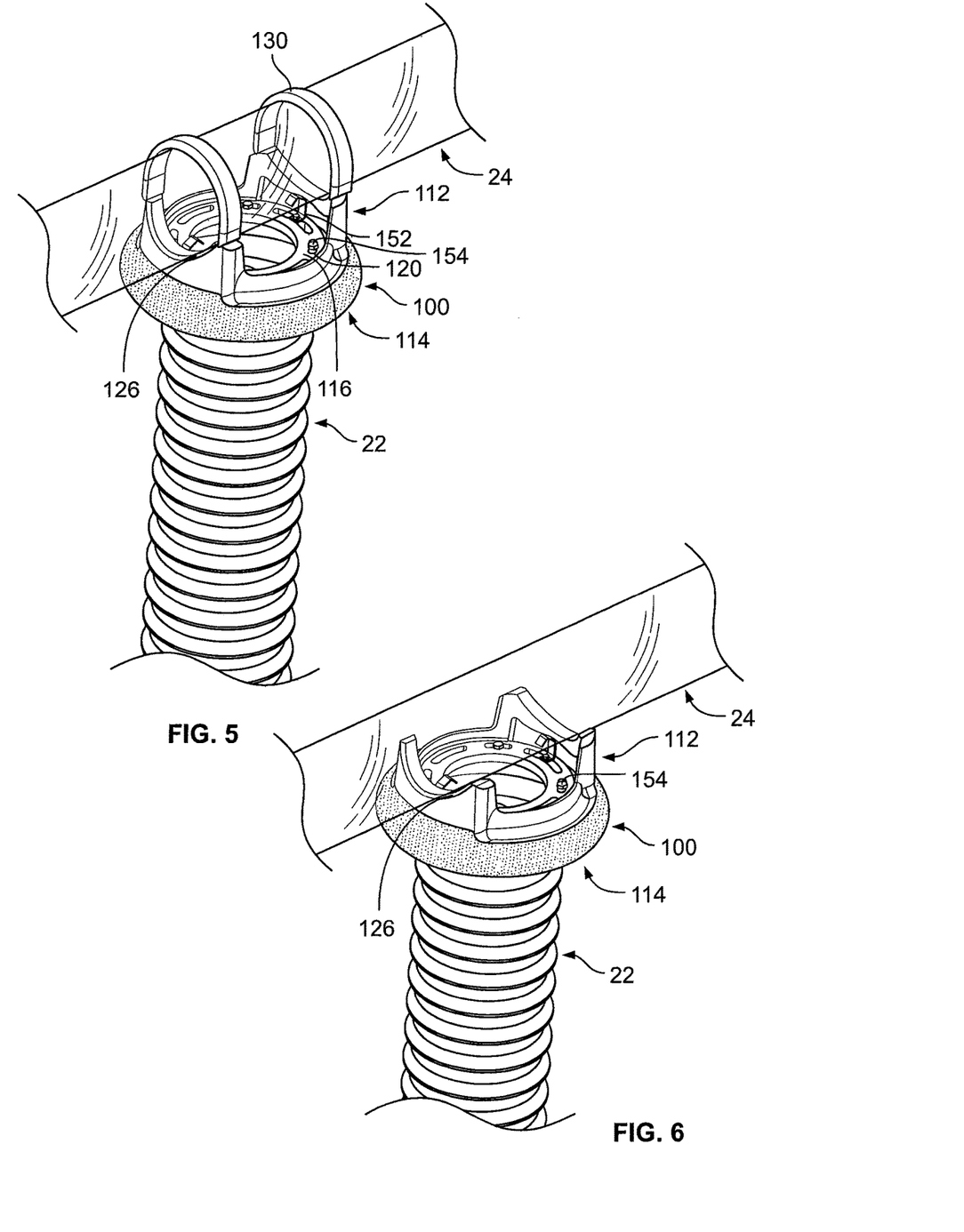
FIG. 5 is a perspective view of the bus support of FIG. 3 mounted to an insulator and a conductor installed in the bus support in a slide fit configuration.
FIG. 6 is a perspective view of the bus support of FIG. 3 mounted to an insulator and a conductor installed on the bus support in a rigid fit configuration.

FIG. 5 illustrates the bus support 100 installed on an insulator 22. A top portion of the insulator 22 is received through the corona shield opening 144 (FIG. 4) such that the corona shield 114 surrounds the top portion of the insulator 22. The insulator engagement ledge 116 rests on the top of the insulator 22. Fasteners 154 (e.g., hex head bolts) are received through the mounting apertures 120 and/or the slots 130 in the insulator engagement ledge 116 to mount the bus support 100 to the insulator 22.

The side walls 150 shield the mounted exposed fasteners 154 (e.g., the exposed bolt heads) which may have sharp edges and corners. Therefore, the sidewalls 150 reduce the likelihood of an increase in electrical field concentration at the fasteners 154 that may generate an electrical arc therefrom.

A cylindrical and/or tubular bus conductor 24 is received in the channels 126 of the bus support portion 112. FIG. 5 illustrates a "slide fit" configuration. In this regard, the arch supports 130 are included on the bus support portion 112 and the conductor 24 is slidingly installed in the bus support 100 through the openings defined by the channels 126 and the arch supports 130.

Referring to FIGS. 3 and 5, the bus support 100 may include resilient members such as springs 152 mounted to the insulator engagement ledge 116 adjacent the bus support walls 124. The springs 152 are configured to resiliently engage the installed conductor 24 to mitigate chattering or vibration that may cause radio interference.

FIG. 6 illustrates the bus support 100 installed on the insulator in an alternative "rigid fit" configuration. The arch supports 130 are omitted in this configuration. The conductor 24 may be installed in the bus support 100 by welding the conductor 24 in the channels 126 of the bus support portion 112. The conductor 24 is then firmly held in the channels 126. The bus support 100 with the conductor 24 installed thereon may then be installed on the insulator 22 in the manner described above in reference to FIG. 5.

Some embodiments of the invention are directed to an insulator and bus support assembly including the insulator 22 and the bus support 100 as shown in FIG. 5 or FIG. 6. The assembly may further include the bus 24.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A bus support comprising:
   a corona shield portion; and
   a bus support portion on the corona shield portion, the bus support portion comprising:
      an insulator engagement ledge comprising one or more mounting apertures configured to receive a fastener therethrough for mounting the bus support to an insulator; and
      first and second bus support walls extending upwardly from opposite sides of the insulator engagement ledge, each bus support wall including a U-shaped channel defined therein that is configured to receive and support a cylindrical and/or tubular bus conductor;
   wherein the corona shield portion and the bus support portion form a monolithic structure.

2. The bus support of claim 1 wherein each of the first and second bus support walls comprises an outer surface and an opposite inner surface with a weight reduction recess defined in the inner surface that extends downwardly past the insulator engagement ledge.

3. The bus support of claim 2 wherein the bus support portion further comprises first and second side walls extending upwardly from opposite sides of the insulator engagement ledge and extending between the first and second bus support walls.

4. The bus support of claim 3 wherein each one of the weight reduction recesses extends along a major portion of a distance between the first and second side walls.

5. The bus support of claim 1 wherein the corona shield portion includes a curved outer surface and a substantially flat inner surface.

6. The bus support of claim 5 wherein the corona shield portion has a substantially semi-circular cross-sectional shape.

7. The bus support of claim 5 wherein the corona shield portion is solid.

8. The bus support of claim 1 wherein the bus support is formed of cast aluminum.

9. The bus support of claim 8 wherein the corona shield portion is machined to have an average surface roughness of no greater than 63 microinches.

10. The bus support of claim 1 wherein the corona shield portion has a diameter of at least 17.4 inches.

11. The bus support of claim 1 wherein each of the first and second bus support walls includes an upper surface on opposite sides of the U-shaped channel, the bus support further comprising an arch-shaped support member connected to the upper surface of each of the first and second bus support walls, the arch-shaped members configured to surround an upper portion of a cylindrical and/or tubular bus conductor received in the U-shaped channels.

12. The bus support of claim 11 further comprising first and second springs connected to the insulator engagement ledge adjacent the first and second bus support walls, respectively, the first and second springs configured to resiliently engage a cylindrical and/or tubular bus conductor received in the U-shaped channels.

13. The bus support of claim 1 wherein the corona shield portion defines a central circular opening configured to receive an insulator therethrough when the insulator engagement ledge is mounted to the insulator such that the corona shield portion surrounds an upper portion of the insulator.

14. A method of forming a bus support, the method comprising:
casting a one-piece aluminum bus support comprising:
a corona shield portion and a bus support portion on the corona shield portion, the bus support portion comprising:
an insulator engagement ledge comprising one or more mounting apertures configured to receive a fastener therethrough for mounting the bus support to an insulator; and
first and second bus support walls extending upwardly from opposite sides of the insulator engagement ledge, each bus support wall including a U-shaped channel defined therein that is configured to receive and support a cylindrical and/or tubular bus conductor; and
machining the corona shield portion to be substantially smooth.

15. The method of claim 14 wherein each of the first and second bus support walls comprises an outer surface and an opposite inner surface with a weight reduction recess defined in the inner surface that extends downwardly past the insulator engagement ledge.

16. The method of claim 14 comprising machining the corona ring portion to have an average surface roughness of no greater than 63 microinches.

17. A bus support comprising:
a corona shield portion and an integrally formed bus support portion on the corona shield portion, the bus support portion comprising:
an insulator engagement ledge comprising one or more mounting apertures configured to receive a fastener therethrough for mounting the bus support to an insulator;
first and second bus support walls extending upwardly from opposite sides of the insulator engagement ledge, each bus support wall including a U-shaped channel defined therein that is configured to receive and support a cylindrical and/or tubular bus conductor, wherein each bus support wall comprises an outer surface and an opposite inner surface;
a first weight reduction recess formed in the inner surface of the first bus support wall and extending downwardly past the insulator engagement ledge; and
a second weight reduction recess formed in the inner surface of the second bus support wall and extending downwardly past the insulator engagement ledge.

18. The bus support of claim 17 wherein the bus support portion further comprises first and second side walls that extend upwardly from opposite sides of the insulator engagement ledge and that extend between the first and second bus support walls.

19. The bus support of claim 18 in combination with an insulator with the insulator engagement ledge mounted to a top of the insulator by a plurality of fasteners such that the corona shield portion surrounds an upper portion of the insulator.

20. The bus support of claim 18 wherein each of the first and second weight reduction recesses extends along a major portion of a distance between the first and second side walls.

* * * * *